United States Patent [19]

Krohn

[11] Patent Number: 4,606,226
[45] Date of Patent: Aug. 19, 1986

[54] LIQUID LEVEL SENSOR

[75] Inventor: David A. Krohn, Hamden, Conn.

[73] Assignee: Eotec Corporation, West Haven, Conn.

[21] Appl. No.: 632,409

[22] Filed: Jul. 19, 1984

[51] Int. Cl.⁴ .............................................. G01F 23/02
[52] U.S. Cl. ..................................... 73/293; 340/619; 116/227
[58] Field of Search ................ 73/293, 327; 350/96.1, 350/96.23, 96.3; 33/126.4 R, 126.7 R; 340/619; 250/574, 577; 116/227

[56] References Cited

U.S. PATENT DOCUMENTS

| | | | |
|---|---|---|---|
| 1,883,971 | 10/1932 | Kryzanowsky | 73/327 |
| 2,799,089 | 7/1957 | Banker | 33/126.7 R |
| 3,054,291 | 9/1962 | Landwer | 73/293 |
| 3,319,597 | 5/1967 | Schnitzius et al. | 73/327 |
| 3,338,457 | 8/1967 | Tygenhof | 116/227 |
| 3,442,127 | 5/1969 | Nichols | 73/327 |
| 3,448,616 | 6/1969 | Wostl et al. | 73/293 |
| 3,528,291 | 9/1970 | Melone | 116/227 |
| 3,535,934 | 10/1970 | Rapata | 73/327 |
| 3,801,181 | 4/1974 | Kitano et al. | 350/96.31 |
| 3,963,327 | 6/1976 | Poirier | 350/96.1 |
| 4,038,650 | 7/1977 | Evans et al. | 340/619 |
| 4,157,209 | 6/1979 | Amendolia | 73/293 |
| 4,301,597 | 11/1981 | Midorikawa | 33/126.7 R |
| 4,353,252 | 10/1982 | Jeans | 116/227 |

Primary Examiner—Charles Frankfort
Assistant Examiner—Thomas B. Will
Attorney, Agent, or Firm—Darby & Darby

[57] ABSTRACT

A sensor element for a liquid level sensor of the "light prism" type is constructed so as to have a gradually tapering frusto-conical shape and a sensing surface at its lower tip. Such a shape has a tendency to collomate the light transmitted within it and to concentrate all critical reflections in the lower tip of the sensor element, thereby defining a relatively concentrated sensing area. At the same time, the sensor element is shaped and dimensioned in the vicinity of the sensing surface so that the surface tension of the droplet causes the droplet to be lifted upwardly and away from the sensing surface. Any deleterious effect of the droplet on the sensing ability of the sensor is thereby avoided.

13 Claims, 4 Drawing Figures

U.S. Patent     Aug. 19, 1986     4,606,226
FIG. 1
FIG. 2
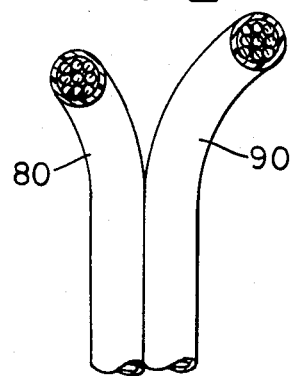
FIG. 3
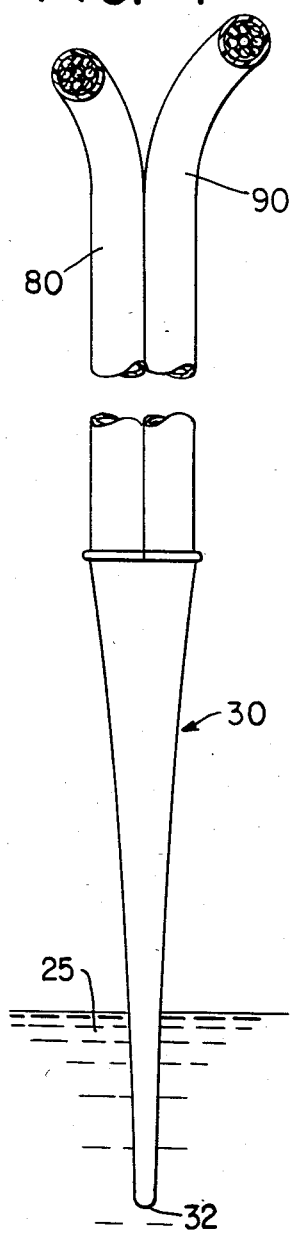
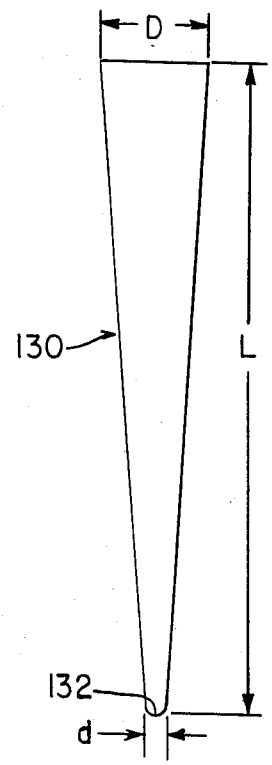
FIG. 4
PRIOR ART
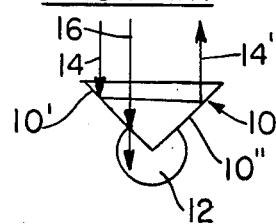

LIQUID LEVEL SENSOR

The present invention relates generally to liquid level sensing and, more particularly, concerns liquid level sensors of the type which senses the light transmissive properties of a "light prism" interposed in a light transmission path, to determine whether or not the liquid level is above a predetermined height.

Optical sensors of the "light prism" type have been used to detect when the level a body of liquid with respect to a predetermined level. In a typical installation utilizing such a sensor, a light prism or equivalent sensor element is fixedly mounted at the predetermined level and is placed in a light transmission path. Most commonly, the sensor element is a true prism or a bent tube. In either case, whether the element internally reflects or transmits an incident light beam depends upon whether or not the element is submerged in liquid. By sensing whether the sensor element is transmitting or reflecting the incident light beam, it is possible to determine whether or not the element is submerged in the liquid, whereby it is known whether or not the liquid level has fallen below the sensor element.

Until now, liquid level sensors of the light prism type have not proven altogether reliable. A major shortcoming of this type of sensor has been its tendency to give false indications. It has been found that such false indications can frequently be traced to the formation of droplets at the lower end of the sensor element, as a result of surface tension of the liquid. Even when the liquid drops below the sensor level, such a droplet adhering to the sensor element can simulate the effect of a high liquid level and can thereby cause the sensor to fail to provide an indication of a low liquid level.

It is an object of the present invention to avoid false level indication occasioned by droplet formation on liquid level sensors of the light prism type.

It is also an object of the present invention to provide an optical liquid level sensor which is reliable and convenient in use, yet relatively inexpensive in construction.

In accordance with the present invention, a sensor element for a liquid level sensor of the "light prism" type is constructed so as to have a gradually tapering frusto-conical shape. Such a shape has a tendency to collomate the light transmitted within it and to concentrate all critical reflections in the lower tip of the sensor element, thereby defining a relatively concentrated sensing area. At the same time, the sensor is dimensioned and shaped so that the surface tension of the droplet causes the droplet to be lifted upwardly and away from the concentrated sensing area. Any deliterious effect of the droplet on the sensing ability of the sensor is thereby avoided.

The foregoing brief description, as well as further objects, features, and advantages of the invention will be more completely understood from the following detailed description of the presently preferred, but nonetheless illustrative, embodiments incorporating the present invention, having reference to the accompanying drawing, in which:

FIG. 1 is a side view of a first illustrative embodiment of the invention showing the optical sensor with the sensing area of the sensor element submerged in liquid;

FIG. 2 is a view similar to FIG. 1 showing the sensor area withdrawn from the liquid with a droplet formed on the sensor element, the droplet having been drawn upwardly, away from the sensing surface;

FIG. 3 is a side view illustrating an alternate embodiment of the sensor element; and FIG. 4 is a side view showing a prior art liquid sensing element of the light prism type, the element being shown with a droplet formed thereon.

Turning first to FIG. 4, there is shown a prior art liquid level sensing element of the light prism type. For illustrative purposes, the element is shown as an actual prism 10 which has been withdrawn from the liquid, and a droplet 12 has formed on the sensor element. Also shown are two incident light rays 14, 16. At the surface 10', ray 14 encounters an interface between the material of the prism 10 (typically glass) and air. The inclination of the surface 10' and 10" is typically selected so that, with the indices of refraction for glass and air, the ray 14 would essentially be reflected internally from surfaces 10' and 10" and returned as light ray 14'. Theoretically, this is the manner in which all light rays should be treated when the prism is not submerged in the liquid.

The light ray 16 falls upon the surface 10' at a point where the droplet has formed. Accordingly, ray 16 encounters an interface between glass and liquid at which, according to the design of the sensor element, the ray 16 is transmitted through the prism. This is the manner in which all light rays should be treated if the prism were submerged in the liquid. Assuming a substantial number of light rays fall upon the area of the prism which includes the droplet, a substantial proportion of the light transmitted into the prism is also transmitted through it. Whether liquid level is determined by sensing transmitted light below the prism or reflected light above the prism, the prism could then provide a false indication that it is submerged when, in fact, the liquid level has dropped so much that the prism is exposed to air. Even if a false indication were not provided, the droplet formation could result in the spurious transmission of a sufficient amount of light to produce an indeterminate indication intermediate the two which would normally be expected (i.e. submerged or exposed-to-air). Strictly speaking, this is not an erroneous indication, but still represents a failure of the sensor.

FIGS. 1 and 2 illustrate a preferred embodiment incorporating the present invention and showing a sensor element in the "submerged" and "exposed-to-air" positions, respectively. The sensor element 30 has secured to its upper end a receiving fiber optic conduit 80 to which is connected a source of light (not shown) and a transmitting fiber optic conduit 90 which is connected to a photosensor (not shown).

As will be explained below, the construction of a sensor element in accordance with the present invention results in substantially all sensing thereof being performed at the lower tip which defines a sensing surface 32. Hence, in FIG. 1, with the tip 32 submerged in a liquid 25, sensor 30 operates in the manner of a conventional sensor of the light prism type, with internal reflection being interrupted, so that the transmitting path between receiving conduit 80 and transmitting conduit 90 is interrupted. When the sensor element 30 is withdrawn from the liquid 25 and exposed to the ambient atmosphere (e.g. air), a droplet 27 is formed, but owing to the construction of sensor element 30, this droplet is drawn upwardly, away from the sensing tip 32. Although a droplet has formed, the sensing tip 32 is in the "exposed-to-air" condition and, in the manner of the theoretical sensor of the light prism type, will internally reflect light from receiving conduit 80 and return it to the transmitting conduit 90. With this internal light reflection by the sensing area 32, the transmission path between receiving conduit 80 and transmitting conduit 90 is completed, resulting in the detection of an "exposed-to-air" condition at the photodetector. Moreover, this condition is reliably detected, even when a droplet is formed on the sensor element.

The sensor element 30 is constructed so as to be frusto-conical in shape. In the preferred embodiment, the sensor element 30 is made of a material known in the trade as SUPERSIL and has a convex taper towards its sensing tip 32. This permits the surface of the lowermost portion of the sensor in the vicinity of the tip to be nearly vertical (i.e. a cylindrical portion of the element body). Preferably, the lowermost point 0.1–0.2 inches of the sensor are nearly cylindrical in shape, in order to maximize the lifting force exerted on a droplet. In the preferred embodiment, the sensor is 0.8 inches long (dimension L), 0.134 inches in diameter at its widest point (dimension D), and tapers down to a 0.025 inch diameter at its tip (dimension d), the sensing surface 32 of which is generally hemispherical. A sensor having the structure of the preferred embodiment of FIGS. 1 and 2 has been found to work effectively with the following liquids: isopropyl alcohol, liquid detergent, heavy machine oil, light machine oil, transmission fluid, mineral spirits, gasoline, milk, carbondated beverages, coffee, and boiling water.

Although the preferred structure has been found to be capable of wide application, experimentation has shown that various parameters may be modified without substantially sacrificing features and benefits of the invention. For example, the lifting property of the sensor tip will be effective if the dimension d is no greater than the minimum diameter that a droplet of the liquid can assume (this is determined by the composition and properties of the liquid). For most applications, this will be true if d is less than 0.06 inches. Also, D is preferably 3 to 5 times d, in order not to diminish the amount of light coupled into the sensor. It is also preferred that the dimension L be between ¼ inch and 1 in. Although these parameters are preferred from a practical point of view, they are not intended to limit the application of the present invention, the scope of which is defined by the accompanying claims.

FIG. 3 illustrates an alternate embodiment of 130 of the sensor element 30 illustrated in FIGS. 1 and 2. Sensor element 130 is identical in most respects to sensor element 30, and corresponding components are indicated with a similar reference character, but with a "1" prefix. The Primary difference between sensor element 30 and sensor element 130 is that sensor element 130 has a linear taper, as opposed to a concave one. Otherwise, sensor element 130 is substantially identical in structure and application to sensor element 30.

Those skilled in the art will appreciate that the relatively gradual taper of sensor elements 30, 130 will result in light transmitted with the sensor elements being essentially collomated. As a result, substantially all internal reflections which produce the same phenomenon as a light prism occur at the sensor tips 32, 132. At the same time, the region near and immediately above the sensor tips 32, 132 is constructed to draw upwardly any droplets that may be formed on the sensor. As a result, the sensitive sensor tips 32, 132 are unaffected by droplet formation, and consistent, reliable operation of the sensor is obtained.

It will also be appreciated that, as a result of internal collomation, the present sensor design collects light more effeciently than conventional prism devices. In addition, the present device can be made quite compact so as to fit in normally inaccessible spaces.

Although preferred forms of the invention have been disclosed for illustrative purposes, those skilled in the art will appreciate that many additions, modifications, and substitutions are possible without departing from the scope and spirit of the invention as defined in the accompanying claims.

What is claimed is:

1. A sensor for use in an optical liquid level sensor of the type interposing a submersible, prism-like sensor in a light transmission path, said sensor comprising:
   a sensor element made of a solid, light transmitting material, said element being formed in a frusto-conical shape with a height L, an upper diameter D and a lower diameter d and a sensing surface located substantially near the bottom thereof, said sensor element tapering gradually from a portion of diameter D to the portion of diameter d, a region of said sensor element in the vicinity of said portion of diameter d being dimensioned to be no greater than the minimum diameter that a droplet of the liquid can assume and shaped so as to draw upwardly and away from said sensing surface any droplet of liquid formed on said sensor element when the level of liquid has dropped below said sensor to avoid false level indications;
   means for coupling the top of said sensor element to a source of light; and
   means for coupling the top of said element to photodetecting means.

2. In combination with a sensor element in accordance with claim 1, means for retaining said sensor element in a predetermined position with respect to a nominal level of a body of liquid.

3. A sensor in accordance with claim 1 wherein said sensor element tapers concavely from said portion of diameter D to said portion of diameter d.

4. A sensor in accordance with claim 1 wherein said sensor element tapers linearly from said portion of diameter D to said portion of diameter d.

5. A sensor in accordance with claim 1 wherein said sensor element is substantially cylindrical over a portion of said body in the range of 0.1 to 0.2 inches from said sensing surface.

6. A sensor element in accordance with claim 5 wherein said sensing surface is substantially hemispherical.

7. A sensing element in accordance with claim 5 wherein the diameter D is between 3 and 5 times the diameter of d.

8. A sensing element in accordance with claim 7 wherein d does not exceed 0.06 inches.

9. A sensing element in accordance with claim 8 wherein L is between ¼ inch and 1 inch.

10. A sensor element in accordance with claim 1 wherein said sensing surface is substantially hemispherical.

11. A sensing element in accordance with claim 1 wherein the diameter D is between 3 and 5 times the diameter of d.

12. A sensing element in accordance with claim 1 wherein d does not exceed 0.06 inches.

13. A sensing element in accordance with claim 1 wherein L is between ¼ inch and 1 inch.

* * * * *